Dec. 12, 1933.    B. H. HAWKINS    1,939,006
SAFETY DEVICE FOR PUNCH PRESSES
Filed July 14, 1930    2 Sheets-Sheet 1

Inventor
Bert H. Hawkins

By
Bottum, Hudnall, Fisher, McNamara & Michael
Attorneys

Dec. 12, 1933.  B. H. HAWKINS  1,939,006
SAFETY DEVICE FOR PUNCH PRESSES
Filed July 14, 1930   2 Sheets-Sheet 2
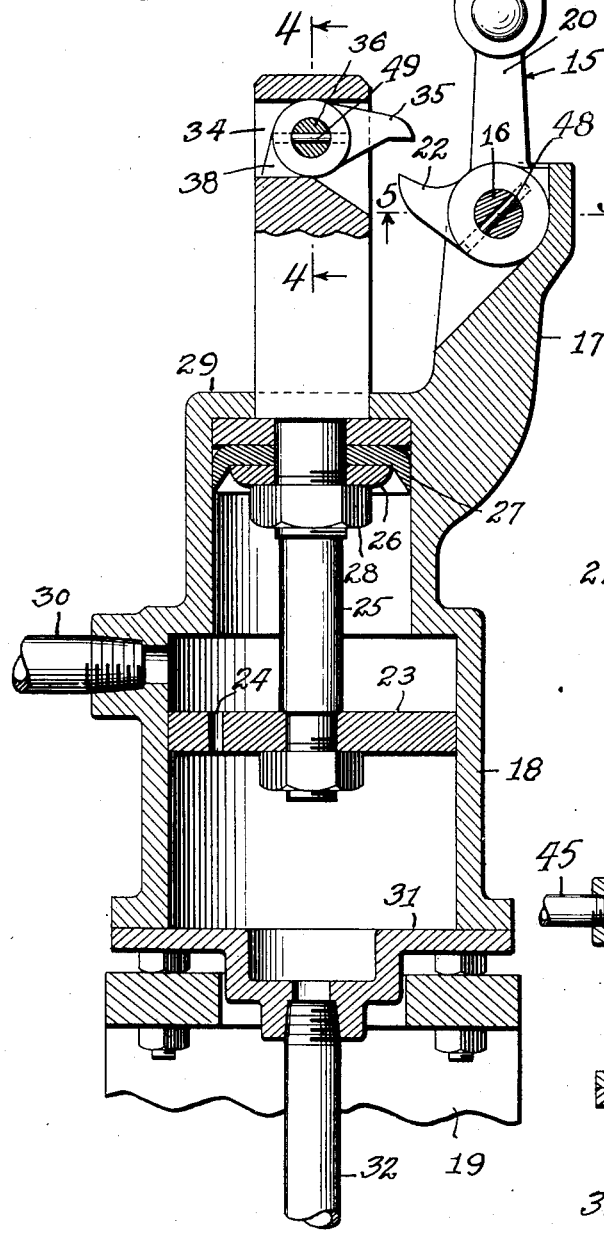
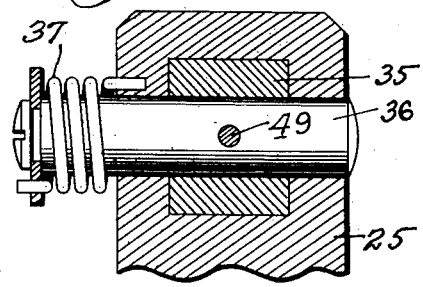
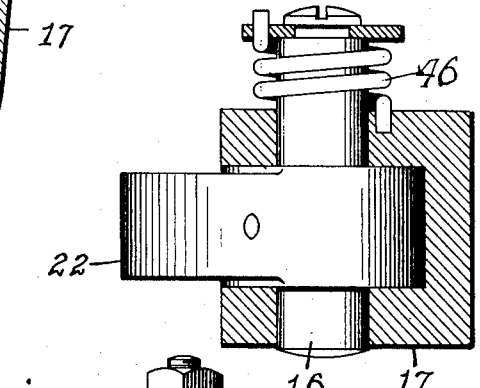
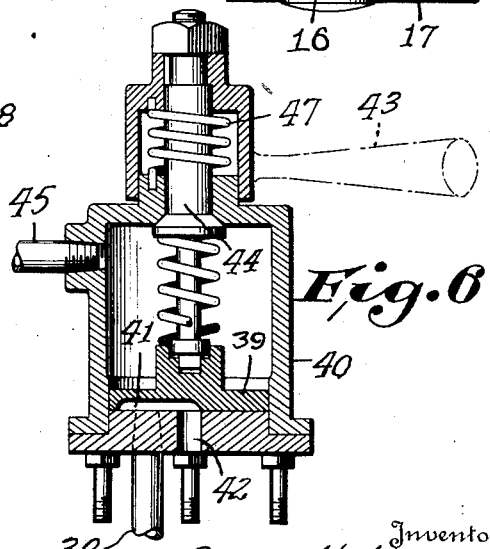
Inventor
Bert H. Hawkins Patented Dec. 12, 1933

1,939,006

UNITED STATES PATENT OFFICE 1,939,006

SAFETY DEVICE FOR PUNCH PRESSES

Bert H. Hawkins, Royal Oak, Mich., assignor to McCord Radiator & Manufacturing Company, Detroit, Mich., a corporation of Maine Application July 14, 1930. Serial No. 467,781

4 Claims. (Cl. 192—82)

This invention relates to safety devices for punch presses to guard against accidental repeating of the press and thus avoiding injury to operators, which has heretofore occurred by the press being able to repeat when not intended or desired.

In my co-pending application, Serial No. 467,474, filed July 12, 1930, a safety device for this purpose is described and claimed. Said device is particularly applicable for punch presses which are operated at relatively slow speeds, as required for some classes of work. The actuation of the device to move the clutch dog into and out of action with respect to the clutch is positively controlled in both directions through the medium of a fluid pressure motor which is controlled by the operator of the press. Controlling the movement of the safety device in both directions is perfectly feasible for a press which does not operate at a high speed, as the movement of the dog into and out of engagement with the clutch is within the period of time that the fly wheel or crank shaft makes one complete revolution.

In a high speed press such as is required for a rapid stamping out of work the stroke of the plunger is so rapid that the clutch dog must be returned to clutch disengaging position almost immediately after it has released the clutch so that the dog will disengage the clutch after each complete revolution of the crank shaft, and thus prevent accidental repeating of the press, which, if loaded, would likely injure the hands of the operator while reaching into the press between the die and the punch for withdrawing a stamping, or inserting a blank. In these presses as heretofore constructed, a foot pedal arrangement has been provided for tripping the dog. Frequently the operator does not release the pedal quickly enough after tripping the dog, with the result that the press may make two or more revolutions before it can be stopped, with the likelihood of injuring the operator. Moreover, the foot pedal connections depend on spring means to return the pedal to its raised position, and, as such means become weak in its repeated expansion and contraction, the dog is not likely to be returned quickly enough and the press may accidentally repeat. Furthermore, the connections between the parts are subject to wear, which also contributes to a faulty operation and presents the possibility of the clutch accidentally repeating.

In accordance with my present invention, I employ a safety device having a head center position to positively hold the dog in clutch disengaging position and prevent the accidental release of the dog from the clutch, as in my co-pending application aforesaid.

The object of my present invention is to provide a fluid pressure motor for shifting the safety device from its dead center position when withdrawing the dog from the clutch to start the press and to provide a trip in connection with the safety device and the motor to release the safety device immediately the dog has been tripped, and permit the dog to instantly return to clutch disengaging position so as to stop the press at the end of each complete revolution and thus prevent accidental repeating of the press and prevent accidents, as heretofore.

In the accompanying drawings:

Fig. 3 is a vertical sectional view through the pressure motor;

Figs. 4 and 5 are vertical and horizontal sectional views, respectively, taken on lines 4—4 and 5—5 of Fig. 3; and Fig. 6 is a vertical sectional view of the control valve for the motor.

Figure 1:
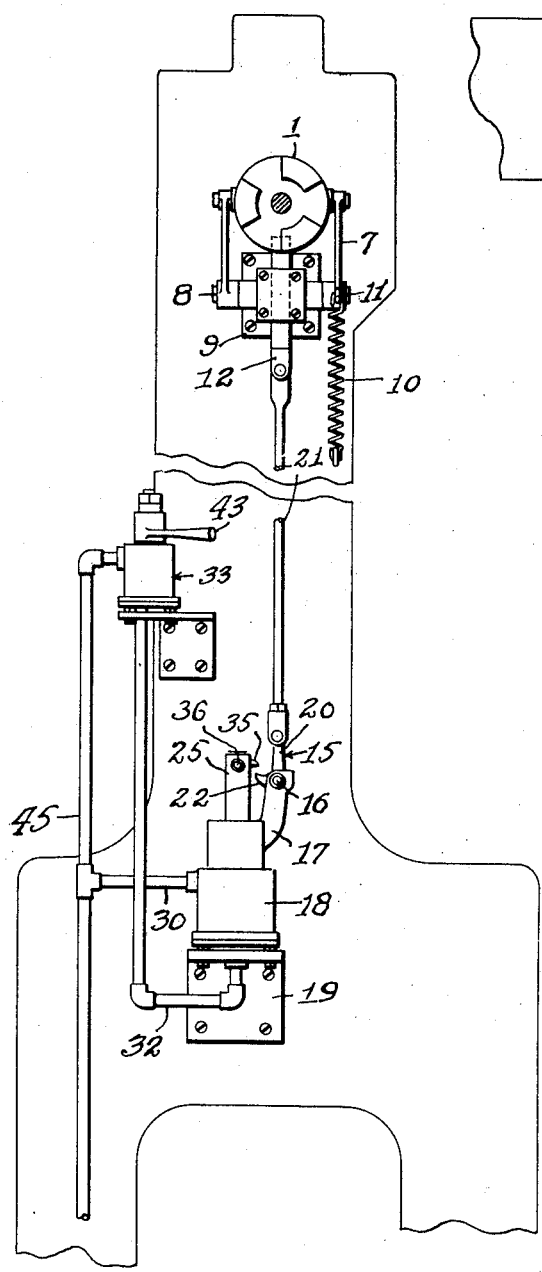
Figs. 1 shows a side view of the safety device of my present invention applied to a press.
Figure 2:
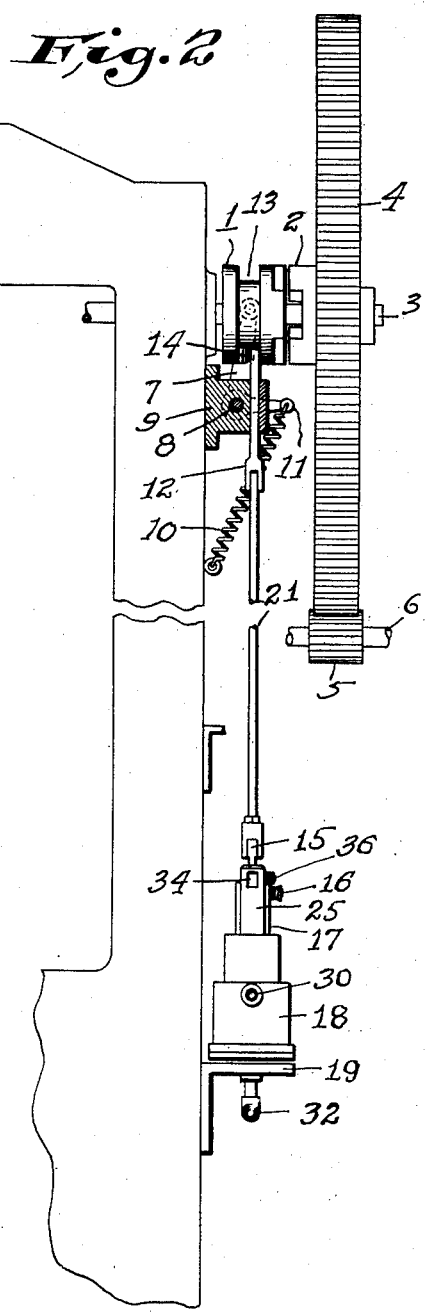
Fig. 2 is an end view of the device.

The press to which my invention is particularly applicable is of the high speed intermittently operated positive clutch type. The clutch is at one end of the press, and includes two clutch members, 1, 2, both on the crank shaft 3, as in structures of this character. The member 1 is splined on the shaft for sliding movement into and out of clutched engagement with the other member 2 which is fixed to a large gear wheel 4 revolvably mounted on the shaft and meshing with a drive pinion 5 on the fly wheel jack shaft 6 as shown in Fig. 2.

The clutch members 1, 2 have lugs or teeth which when engaged connect the crank shaft 3 with the continuously revolving drive gear 4. In the particular form of press illustrated, a yoke 7 slides the clutch member 1 into and out of engagement with the clutch member 2, the yoke rocking on a horizontal axis 8 in a bracket 9 secured to one of the uprights of the frame of the press, as shown. The movement of the yoke to engage the clutch is affected by coiled spring 10, one end of which is attached to the frame of the press, and the other end to an arm 11 extending outward from the yoke. An endwise movable dog 12 is used to declutch the member 1 from the member 2. The dog is slidably mounted in the bracket 9 and has its upper end bevelled which when projected into an annular groove 13 in the member 1 in the path of the cam lug 14 in said groove, causes the cam on contacting with the dog to slide the member 1 out of clutched engagement with the member 2. Withdrawing the dog from the cam releases the member 1 to the action of the spring 10, which slides the member 1 into engagement with member 2, as in clutch structures of this kind.

The safety device of my invention comprises a bell crank lever 15 arranged below the dog and fulcrumed at 16 on a standard 17 extending upward from the casing 18 of the fluid pressure motor which is mounted on the base of the press by a bracket 19. The arm 20 of the lever 15 is connected by a link 21 to the lower end of the dog 12. The parts are so arranged that when the dog 12 is in position to disengage the clutch the pivotal connections of the link 21 with the dog and the arm 20 and the fulcrum 16 of the lever 15 are in direct vertical alinement, thereby presenting a dead center position for the lever to positively hold the dog 12 in clutch disengaging position and prevent accidental movement of the dog to release the clutch to repeat the press with the likelihood of injury to the operator, as heretofore referred to. The other arm 22 of the lever 15 is relatively short and extends outward from the lever to one side thereof, as shown.

The casing 18 is formed to provide a cylinder in which is located a piston 23 having one or more apertures 24 extending therethrough so as to balance the fluid pressure on opposite sides of the piston for the purpose to be presently described. A rod 25 extends into the cylinder through its upper end and is connected at its lower end to the piston 23, as shown in Fig. 3. A second piston 26 is mounted on the rod within the cylinder above the lower piston 23. The piston 26 is much smaller in diameter than the lower piston, and the upper part of the cylinder in which the upper piston has movement is made of a diameter to accommodate the same. A cup-shaped packing 27 is held by a nut 28 against the upper side of the smaller piston 26 so as to prevent leakage of fluid pressure out of the cylinder around the smaller piston. The piston 23 presents a larger pressure area than the smaller piston 26, with the result that when the fluid pressure is balanced on opposite sides of the larger piston 23, such pressure will act against the smaller piston 26 and move the piston assembly and rod upward, the extent of upward movement being limited by contact of the upper piston 26 with the top wall 29 of the cylinder, as shown in Fig. 3.

The cylinder 18 is provided at one side with a tapped hole with which is connected a pipe 30 for supplying fluid pressure into the cylinder between the pistons. The bottom wall 31 of the cylinder is provided with a tapped hole with which is connected a pipe 32 which leads to a valve device 33 by which the pressure in the cylinder 18 beneath the large piston 23 may be relieved when it is desired to move the pistons downward to shift the bell crank lever 15 off of its dead center position to withdraw the dog 12 from the clutch member 1 to start the press. When the pressure beneath the piston 23 is relieved, the pressure on the upper side of the piston will move the same downward as is apparent.

The rod 25 is provided at its upper end with a transverse slot or opening 34 in which is located a trip member 35. The trip is mounted for rocking movement in the slot on a horizontal pin 36, the latter being journaled in the rod at the sides of the slot with the trip fixed on the pin so that both turn in unison. The pin extends beyond the rod at one side with a coiled spring 37 about the pin with one end of the spring fixed to the rod and the other end fixed to the pin so that the spring will constantly act on the pin to return the trip to its normal position for engagement with the short arm 22 of the bell crank lever 15. The top portion of the rod extends across the slot 34 on the side of the pin adjacent the lever 15 to provide a stop for the trip 35 when in its normal position to engage the short arm 22 of the lever 15 to shift it out of its dead center position in the downward movement of the rod. The trip 35 has a lug 38 to engage against the bottom of the slot to prevent movement of the trip as it is moved down against and past the short arm of the lever. This lug is on the under side of the trip so as not to hinder turning of the trip as it passes the short arm of the lever in the upward movement of the piston assembly to raise the trip to starting position, as shown in Fig. 3. The slot is elongated vertically on the side of the trip to allow for this movement.

The valve device 33 is substantially the same as shown and described in my co-pending application heretofore referred to. It will only be necessary in the present case to describe the valve device and its operation generally as required for a full understanding of the operation of the unit 18 to effect shifting of the lever 15 from its dead center position to withdraw the dog 12 from the clutch member 2 to start the press. The valve device employs a rotary valve member 39 mounted in a casing 40 and having a groove 41 in its under side in constant communication with the exhaust port 42 in the bottom wall of the casing 40 against which the valve member 39 seats. The pipe 32 opens through the bottom wall of the casing 40 at the point spaced outward from the exhaust port 42 and when the valve member 39 has been turned to the position shown in Fig. 6, the groove 41 connects pipe 32 with exhaust port 42. This exhausts the fluid pressure in the cylinder 18 below the large piston 23 to the atmosphere and permits the pressure on the upper side of the piston to lower the rod 25 to shift the lever 15 from its dead center position.

The valve 39 is turned through a manually operable control member 43 which by stem or shaft 44 is connected with the valve member 39 for turning it, the same as in my co-pending application. Pipe 45 is the main supply pipe of the device and is connected with casing 40 to supply fluid pressure thereto to seat the valve member 39, as in my co-pending application. Pipe 30 is connected with pipe 45 to supply fluid pressure to cylinder 18 between the pistons therein. Suitable locking devices may be provided for locking the control member 43 in clutch disengaging position so that the control member cannot accidentally move out of such position to accidentally start the press. The locking devices may be constructed and arranged in the manner shown in my co-pending application; and there may be a remote control for them as described in that case.

In operation, the operator of the press moves the control member 43 by hand into a position to exhaust the portion of the cylinder 18 below the large piston 23 when the press is to be started. This causes the rod 25 to be drawn downward by fluid pressure and the trip 35 engages the arm 22 of the lever 15 to withdraw the dog 12 from the clutch so that the spring 10 may move the clutch member 1 into clutching engagement with the member 2. Trip 35 and arm 22 engage only at the outer ends so that in the continued downward movement of the trip with the rod, the trip will pass beyond the arcuate movement of the arm to release it long before the press has made a complete revolution. As soon as the arm 22 is released, a coiled spring 46 associated therewith (Fig. 5) immediately returns the lever 15 to its dead center position and the dog 12 is thus projected into the groove 13 to stop the press on contact with the cam 14. The operator either returns the handle 43 to starting position to cut off the pipe 32 from the exhaust port 42 or merely releases the handle to permit the coiled spring 47 associated therewith (Fig. 6) to automatically return the handle to its starting position. In turning the handle, the rotation of the valve member 39 moves the groove 41 out of register with the pipe 32. As soon as the pipe 32 is closed to the atmosphere, the fluid pressure in the cylinder 18 becomes quickly equalized on opposite sides of the large piston 23 through the leak holes 24 in said piston. This causes the piston assembly to be moved upward, carrying the trip 35 past the now rigidly held arm 22 of the lever 15. The trip on passing the arm ratchets thereover, and when free of the same is projected outward by its spring 37. The upward movement of the trip 35 is so timed as to be in a position to re-engage the arm 22 when it is desired to again start the press, which is accomplished by the operator again turning the valve to exhaust the pressure beneath the piston 23.

Tripping the lever 15 off of its dead center position and immediately allowing it to return to that position, actuates the dog 12 fast enough to return the dog to clutch disengaging position before a complete revolution of the press, therefore, particularly adapting my safety device to a high speed press because the return movement of the dog is not dependent upon the return movement of the piston elements in the unit 18, which movement might be too slow to return the dog in time to prevent repeating of the press after the first revolution. Consequently the safety device can be used with a high speed press and will positively and securely hold the dog 12 in clutch disengaging position so that no opportunity is afforded for the dog to be accidentally moved out of such position to repeat the press and injure the operator, as heretofore.

In the drawings I have shown the control member 43 to be arranged to be operated by hand. It could, of course, be arranged to be operated by a foot pedal, or by other form of operable means, as may be required for various types of high speed presses. The safety device and the means of tripping it are simple in construction and operation, and effect a positive and quick release and return of the clutch dog so that the press cannot run through two or more revolutions before it can be stopped.

The spring 46 for the lever 15 is preferably coiled about the fulcrum or axis member 16 for said lever, as shown in Fig. 5. One end of the spring is attached to the lever and the other end to the axis member. The latter is preferably fixed by a pin 48 to the lever 15 and extends through the lever to the opposite sides thereof where the ends of the member are journaled in the standard 17 which is made slotted at its upper end to accommodate the lever, as shown in Fig. 5. The trip 35 is fixed by a pin 49 with its axis member 36, as shown in Fig. 3.

The details of structure and arrangement of parts shown and described may be variously changed and modified without departing from the spirit and scope of my invention.

I claim as my invention:

1. A clutch control and safety device for a punch press, comprising a pressure cylinder, a bell crank lever fulcrumed thereon and having one arm adapted to be connected with the releasing element of the clutch of the press, a piston rod slidably mounted in the cylinder, a piston in the cylinder for moving the rod, and a trip member pivotally carried by the rod and adapted to be moved into and out of engagement with the other arm of the lever to shift the same, and means for returning the lever to clutch disengaging position when released by the trip member.

2. A clutch control and safety attachment for a punch press, comprising a pressure cylinder, a piston therein, a bell crank lever adjacent to the cylinder, a piston rod connected with the piston and movable thereby, a trip member mounted on the rod and movable thereby in and out of engagement with the other arm of the lever to shift the same, said trip member being pivoted on the rod so as to ratchet past the arm of the lever on the movement of the rod into starting position of the trip member.

3. In a punch press, the combination with the clutch of the press and an endwise movable releasing element therefor, of a safety device for controlling the action of the clutch through said element for starting and stopping the press, said device comprising a bell-crank lever fulcrumed on the press adjacent the junction of its arms, means connecting one arm of the lever with the element, and means operable on the other arm of the lever for withdrawing the element from the clutch to permit the clutch to engage, the fulcrum of the lever and the connection between the lever and the element being in alinement with each other and with the path of endwise movement of the element when holding the clutch disengaged to prevent accidental release of the element from the clutch.

4. In a punch press, the combination with the clutch of the press and an endwise movable releasing element therefor, of a safety device for controlling the action of the clutch through said element for starting and stopping the press, said device comprising a bell-crank lever fulcrumed on the press adjacent the junction of its arms, a link connecting one arm of the lever with the element, a reciprocal trip member operable on the other arm of the lever for withdrawing the element from the clutch to permit the clutch to engage, the fulcrum of the lever and the link being in alinement with each other and with the path of endwise movement of the element when holding the clutch disengaged to prevent accidental release of the element from the clutch, and spring means for returning the lever and the element to clutch disengaging positions on being released by the trip.

BERT H. HAWKINS.